(No Model.)

A. G. McPHERSON.
HORSE BLANKET.

No. 312,880. Patented Feb. 24, 1885.

Witnesses:
John E. Parker
Harry Drury

Inventor:
A. G. McPherson
by his Attorneys
Howson & Son

UNITED STATES PATENT OFFICE.

ANDREW G. McPHERSON, OF QUINTON, NEW JERSEY.

HORSE-BLANKET.

SPECIFICATION forming part of Letters Patent No. 312,880, dated February 24, 1885.

Application filed December 22, 1884. (No model.)

*To all whom it may concern:*

Be it known that I, ANDREW G. MCPHERSON, a citizen of the United States, and a resident of Quinton, Salem county, New Jersey, have invented certain Improvements in Horse-Blankets, of which the following is a specification.

The object of my invention is to make a horse-blanket which, while presenting the same appearance as an ordinary blanket, will protect the belly of the horse; and this object I attain in the manner hereinafter set forth, reference being had to the accompanying drawings, in which—

Figure 1:
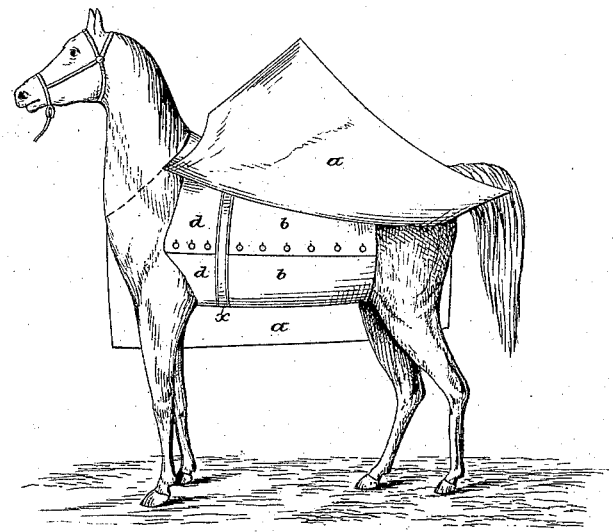
Figure 2:
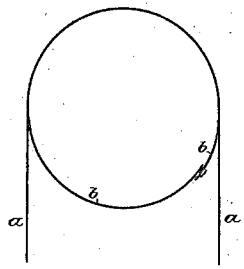
Figure 3:
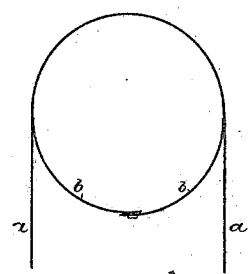

Figure 1 is a view of a horse with my improved blanket, one of the side flaps being raised in order to show the belly-protecting portion of the blanket; Fig. 2, a sectional view of the blanket; Fig. 3, a sectional view showing another form of the blanket, and Fig. 4 a sectional view showing a modification.

The main blanket is of the usual form, fitting over the back and neck of the horse, and having pendent flaps *a a* at the sides to protect the sides and flanks of the horse. The usual blanket, however, has no means of protecting the horse's belly, and this defect I remedy by providing the blanket with additional flaps, *b b*, which are secured at the upper edges to the said flaps *a* of the blanket, and are provided at the lower edges with buttons and button-holes, or equivalent fastening devices, whereby they may be connected so as to envelop and protect the belly of the horse, as shown in Fig. 1. These flaps may be of such length as to cover only that portion of the body in the rear of the saddle-strap *x;* but I prefer to extend the flaps in advance of the saddle-strap in most cases, the front portions of the flaps *d d* being preferably of triangular shape and independent of those portions of the flaps in the rear of the saddle-strap.

Figure 4:
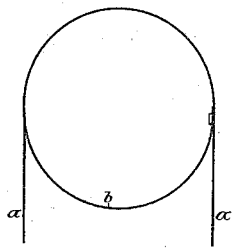

The flap *b* on one side of the blanket may be wider than that on the other side, as shown in Figs. 1 and 2, so that the edges of the flaps meet at the side of the horse; or a single flap, *b*, may in some cases be used, as shown in Fig. 4, this flap being secured at one edge to one of the side flaps, *a*, and provided with means whereby its opposite edge may be secured to the opposite flap *a;* but the form preferred is that shown in Fig. 3, where the two flaps *b* are of equal length, as this dispenses with the long flap, which might prove inconvenient in handling the blanket. Moreover, when two flaps, *b*, of equal length are used, the edges meet beneath the belly, and can be secured from either side of the horse.

I am aware that close-fitting coats have been devised which envelop the body and legs of the horse; but such coats are intended for stable use, and not as substitutes for the usual blanket.

My improved blanket, while effectually protecting the horse, presents the same appearance as an ordinary blanket, and hence is unobjectionable for outdoor use. Blankets already in use need not be discarded, but can be readily altered at slight expense by simply sewing or otherwise securing to the side flaps, *a*, the upper edges of the belly-protecting flaps *b*.

I claim as my invention—

1. A horse-blanket having side flaps, *a*, and belly-protecting flap or flaps *b*, as set forth.

2. A horse-blanket having side flaps, *a*, and opposite belly-protecting flaps, the latter being provided with means for securing their meeting edges, as set forth.

3. A horse-blanket having side flaps, *a*, and belly-protecting flaps *b*, the latter being of equal length and furnished with means whereby their meeting edges may be secured together, as set forth.

In testimony whereof I have signed my name to this specification in the presence of two subscribing witnesses.

ANDREW G. McPHERSON.

Witnesses:
 HENRY BOSSERT,
 HARRY SMITH.